(12) United States Patent
Watanabe et al.

(10) Patent No.: US 8,657,202 B2
(45) Date of Patent: Feb. 25, 2014

(54) CARD READER

(75) Inventors: Takeki Watanabe, Nagano (JP); Toshio Tatai, Nagano (JP)

(73) Assignee: Nidec Sankyo Corporation (JP)

( * ) Notice: Subject to any disclaimer, the term of this patent is extended or adjusted under 35 U.S.C. 154(b) by 325 days.

(21) Appl. No.: 12/675,493

(22) PCT Filed: Jul. 15, 2009

(86) PCT No.: PCT/JP2009/003325
§ 371 (c)(1),
(2), (4) Date: Feb. 26, 2010

(87) PCT Pub. No.: WO2010/010671
PCT Pub. Date: Jan. 28, 2010

(65) Prior Publication Data
US 2011/0121078 A1    May 26, 2011

(30) Foreign Application Priority Data
Jul. 22, 2008    (JP) ................................. 2008-188053

(51) Int. Cl.
*G06K 13/00*    (2006.01)
(52) U.S. Cl.
USPC ......................................................... 235/475
(58) Field of Classification Search
USPC ......................................................... 235/475
See application file for complete search history.

(56) References Cited

U.S. PATENT DOCUMENTS

| 3,946,204 A | * | 3/1976 | Taniguchi et al. | ............ 235/435 |
| 5,196,687 A | * | 3/1993 | Sugino et al. | ................ 235/483 |
| 6,736,318 B2 | * | 5/2004 | Reichardt et al. | ............ 235/441 |

FOREIGN PATENT DOCUMENTS

| JP | 3-38790 A | 2/1991 |
| JP | 5-64963 U | 8/1993 |
| JP | 11-259604 A | 9/1999 |
| JP | 2001-14429 A | 1/2001 |
| JP | 2005-135160 A | 5/2005 |

OTHER PUBLICATIONS

International Search Report for International Application No. PCT/JP2009/003325 mailed Oct. 13, 2009 with English Translation.

* cited by examiner

*Primary Examiner* — Christopher Stanford
(74) *Attorney, Agent, or Firm* — Cantor Colburn LLP

(57) ABSTRACT

In a card reader having a card pulling-preventing function, provided is a card reader that can achieve energy savings. More specifically, a card reader 1 is equipped with a card moving passage 6 in which a card is moved, a pulling-preventing member 9 which is configured to be capable of turning to a closed position to close the card moving passage 6 and to an open position to open the card moving passage 6 and which prevents the pulling of the card at the closed position, an urging member 10 for urging the pulling-preventing member 9 to the closed position, a turning-regulating member which regulates the turning of the pulling-preventing member 9 by abutting on the pulling-preventing member 9 at the closed position, and a solenoid 12 which moves the turning-regulating member 11 to a turning-regulating position at which the turning of the pulling-preventing member 9 is regulated and to a turning position at which the turning of the pulling-preventing member 9 is enabled.

4 Claims, 5 Drawing Sheets

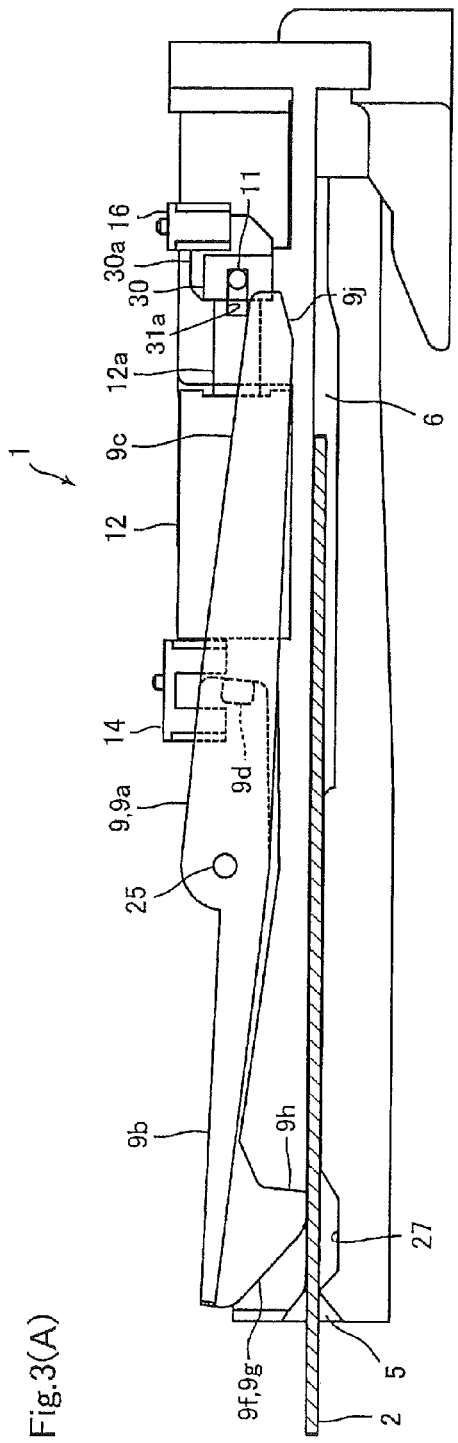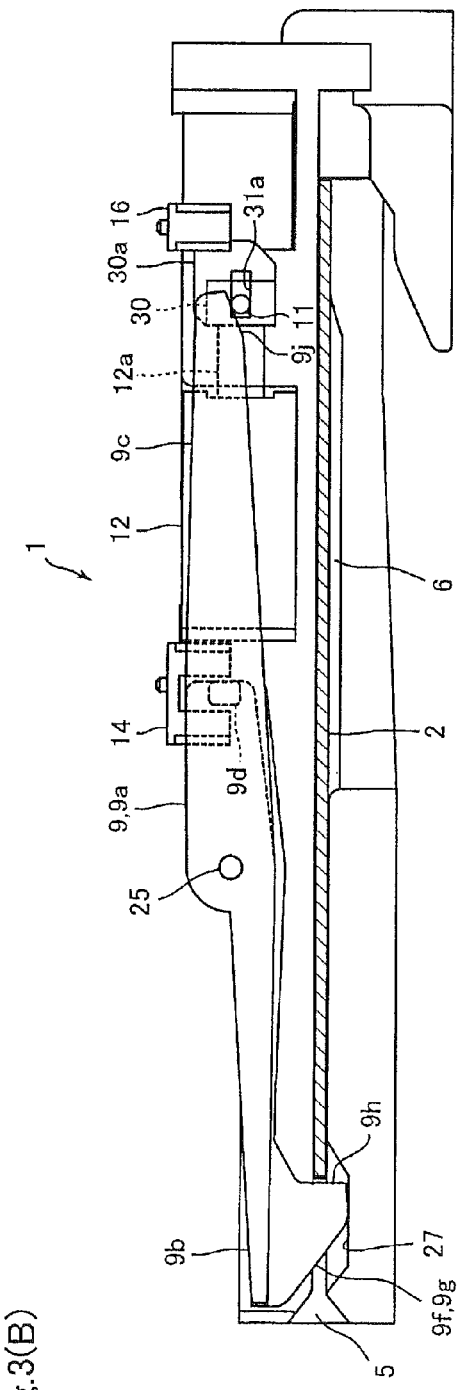
Fig.3(A)
Fig.3(B)

CARD READER

CROSS REFERENCE TO RELATED APPLICATIONS

This is a U.S. national stage of application No. PCT/JP2009/003325, filed on Jul. 15, 2009. Priority under 35 U.S.C. §119(a) and 35 U.S.C. §365(b) is claimed from Japanese Application No. 2008-188053, filed Jul. 22, 2008, the disclosure of which is also incorporated herein by reference.

FIELD OF TECHNOLOGY

The present invention relates to a card reader having a card pulling-preventing function that prevents inserted cards from being pulled out prematurely.

BACKGROUND OF TECHNOLOGY

Conventionally, widely-used are card readers having a card pulling-preventing function that prevents a card inserted to the back from being pulled out prematurely. A known example of this kind of card reader is one having a card locking member to lock the inserted card and a solenoid to drive the card locking member (see Patent reference 1, for example).

In a card reader disclosed in Patent reference 1, the card locking member is provided with a support point, a locking portion and an engaging groove, the support point being the center of turning of the card locking member, the locking portion abutting on the card to prevent the card from being pulled out, and the engaging groove being formed between the support point and the locking portion. Inserted into the engaging groove is an engaging pin arranged at the end of a plunger of the solenoid; as the solenoid is driven, the card locking member turns. In this card reader, the solenoid is driven to turn the card locking member so that a card passage in which the card is moved is closed or opened by the locking portion. Also, in this card reader, the card passage is closed by the locking portion after the card is inserted in order to prevent the card from being pulled out.

Patent reference 1: Japanese Patent Application H11-259604 Unexamined Publication In recent years, energy saving needs have been increasing across all industries. However, in the card reader disclosed in Patent reference 1, the driving power from the solenoid is needed to turn the card locking member and to have the locking member keep the card passage closed; therefore, a solenoid having a large output needs to be used. For this reason, more current needs to be applied to the solenoid during its operation, making it difficult to meet the energy saving needs.

Then, at least an embodiment of a card reader having a card pulling-preventing function provides a card reader capable of achieving energy savings.

SUMMARY OF THE INVENTION

In order to achieve the above benefits, at least an embodiment of a card reader of the present invention comprises a card moving passage in which a card is moved, a pulling-preventing member which is configured to be capable of turning to a closed position to close the card moving passage and to an open position to open the card moving passage and which prevents the inserted card from being pulled out at the closed position, an urging member for urging the pulling-preventing member to the closed position, a turning-regulating member which abuts on the pulling-preventing member at the closed position to regulate the turning of the pulling-preventing member, and a solenoid which drives the turning-regulating member to a turning-regulating position at which the turning of the pulling-preventing member is regulated and to the turning position at which the turning of the pulling-preventing member is enabled.

At least an embodiment of a card reader of the present invention comprises the urging member for urging the pulling-preventing member to the closed position at which the card moving passage is closed, and the turning-regulating member for abutting on the pulling-preventing member at the closed position to regulate the turning of the pulling-preventing member. Also, the solenoid is used to move the turning-regulating member. Therefore, there is no need to use the driving power from the solenoid to turn the pulling-preventing member or to have the pulling-preventing member keep the card moving passage closed. Therefore, even when a solenoid having a smaller output is used, the card can be prevented from being pulled out, and there is no need to apply much current to the solenoid during its operation. Consequently, the card reader can achieve energy savings. Also, since the card reader can achieve energy savings, a bypass power supply can be adopted in which the power supplied from a cable such as an USB (Universal Serial Bus) is used to drive various kinds of devices in the card reader.

In at least an embodiment of the present invention, the card reader may be equipped with a support member on which the turning-regulating member abuts in the direction of the turning of the pulling-preventing member toward the open position, and also which supports the turning-regulating member. With this configuration, even if a user attempts to pull out the card while the turning of the pulling-preventing member in the closed position is regulated by the turning-regulating member, the force transmitted from the pulling-preventing member to the turning-regulating member is prevented from being transmitted further to the solenoid because of the work of the support member. Therefore, damage to the solenoid can be prevented.

In at least an embodiment of the present invention, the pulling-preventing member may be configured to be capable of turning about an axis in the width direction of the card, the width direction orthogonally intersecting with the card moving direction and the card thickness direction. With this configuration, even when the pulling-preventing member is urged to the closed position by the urging member, the pulling-preventing member can easily be turned to the open position by the inserted card.

In at least an embodiment of the present invention, the card reader may be equipped with a guide groove for guiding the turning-regulating member along the card moving direction and the solenoid be positioned such that the plunger moves in the card moving direction, the plunger constituting the solenoid and having the turning-regulating member fixed thereon. With this configuration, the turning-regulating member can be smoothly moved between the turning-regulating position and the turning position.

In at least an embodiment of the present invention, the pulling-preventing member may be provided with the turning center portion which is the center of turning of the pulling-preventing member, a card-abutting portion which abuts on the surface of the end portion of the card to prevent the card from being pulled out, and the regulating member abutting portion on which the turning-regulating member abuts, and the card abutting portion, the turning center portion and the regulating member abutting portion be arranged in this order along the card moving direction. With this configuration, even when the turning-regulating member abuts on the regulating member abutting portion and the turning of the pulling-preventing member is regulated, the card can be pulled out by flexing the portion between the turning center portion and the card abutting portion. Therefore, even if a user attempts to pull out the card while the turning-regulating member is abutting on the regulating member abutting portion to regulate the turning of the pulling-preventing member, an excessive stress is prevented from being applied to the pulling-preventing member and the turning-regulating member, thus preventing damage to the pulling-preventing member and the turning-regulating member.

In at least an embodiment of the present invention, the card reader may be equipped with a sensor for detecting the insertion of a card and the pulling-preventing member be provided with an insertion-detecting portion which collaborate with the sensor to detect the insertion of the card. With this configuration, part of the card-insertion detecting function can be given to the pulling-prevention member; therefore, there is no need to separately provide a member that would collaborate with the sensor to detect the card insertion. Thus, the configuration of the card reader can be simplified.

As described above, in a card reader having a card pulling-preventing function, the present invention can achieve energy savings.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 3(A) is a side view diagram depicting a card being inserted in the card reader of FIG. 1.

FIG. 3(B) is a side view diagram depicting a card which has been completely inserted into the card reader of FIG. 1.

DETAILED DESCRIPTION OF PREFERRED EMBODIMENTS

Embodiments of the present invention are described hereinafter based on the drawings.
(Configuration of Card Reader)

Figure 1:
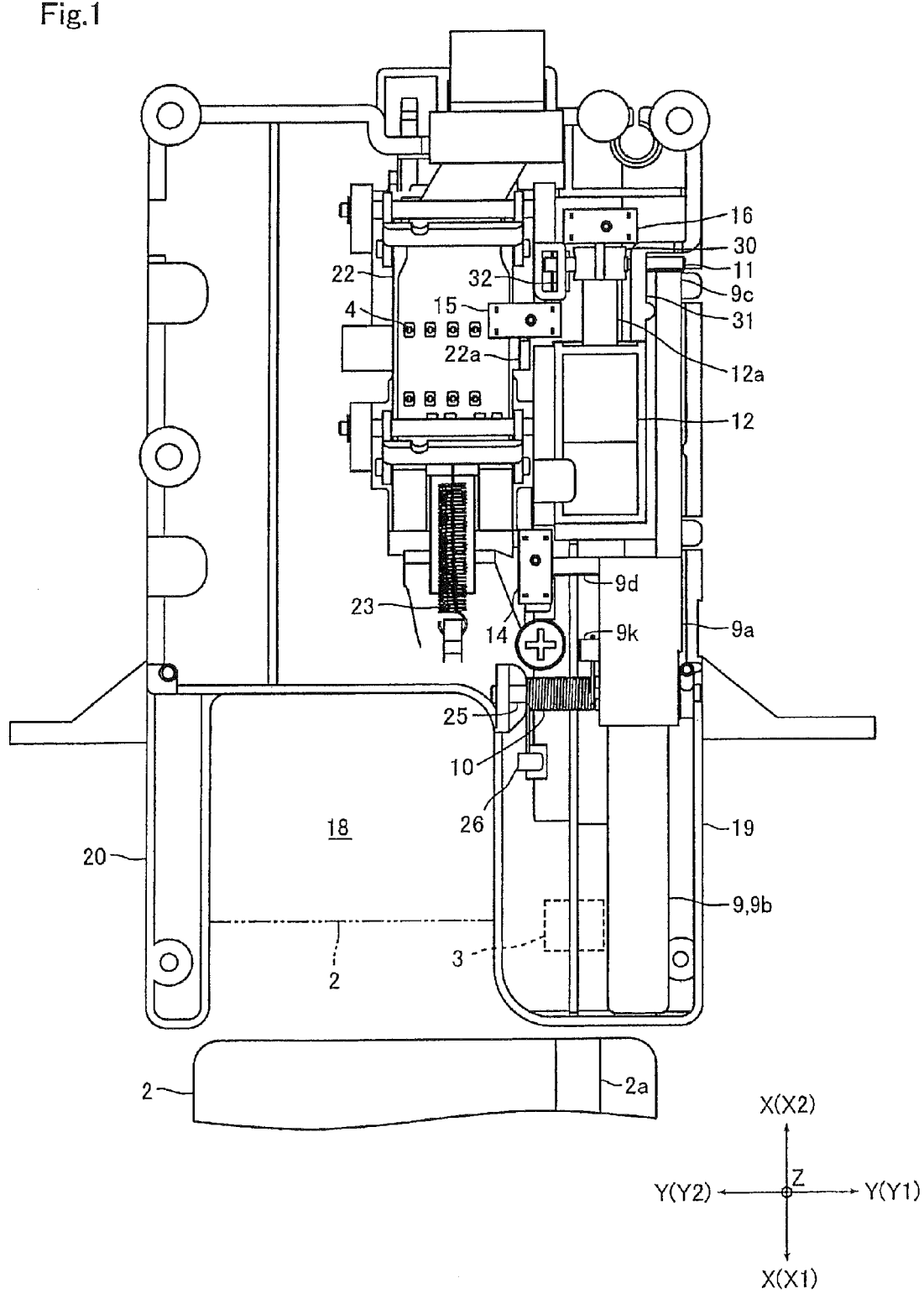
FIG. 1 is a plan view of a card reader of an embodiment of the present invention.
Figure 2:
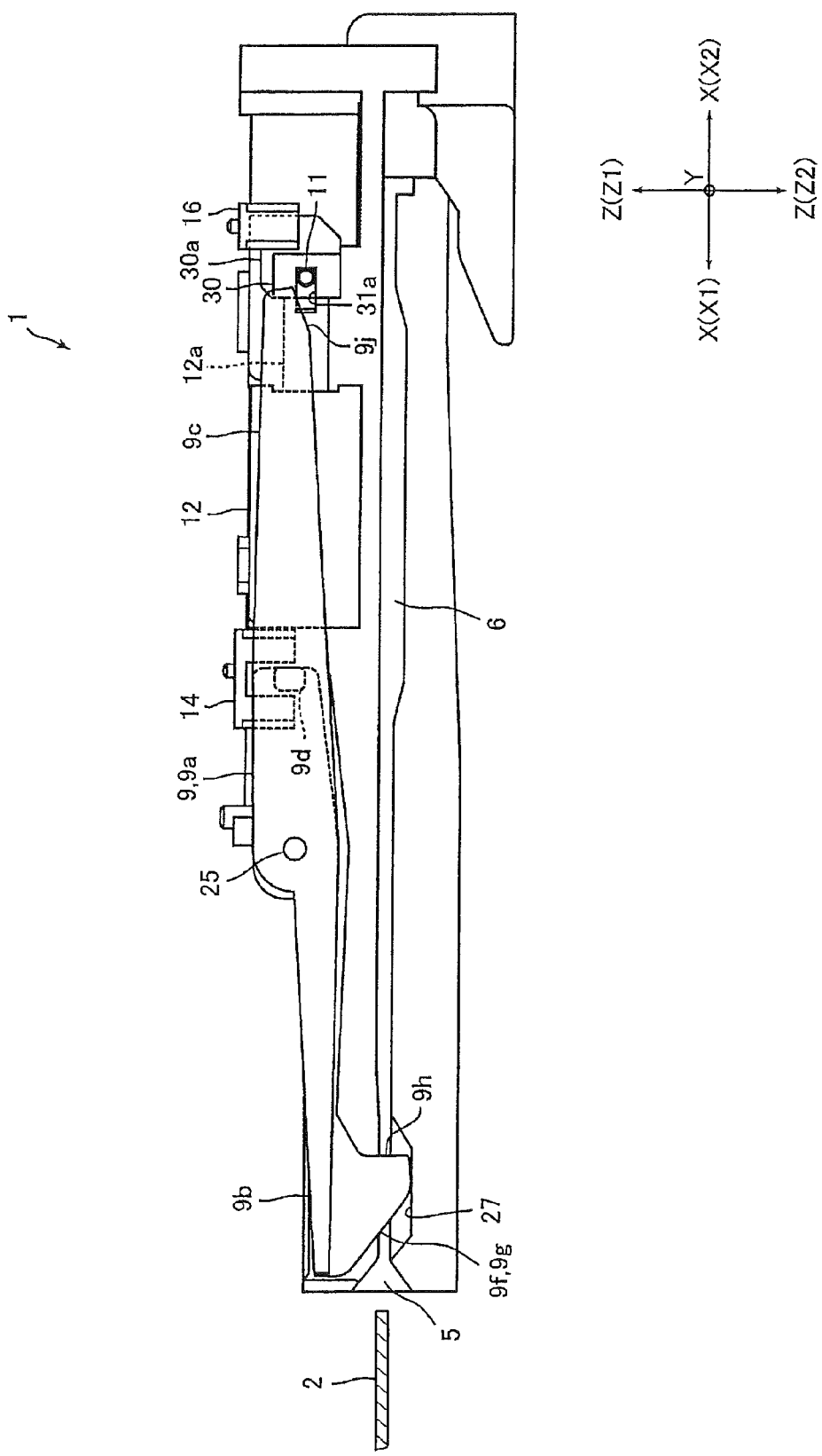
FIG. 2 is a diagram to explain the configuration of the card reader of FIG. 1 from the side.

FIG. 1 is a plan view of a card reader 1 of an embodiment of the present invention. FIG. 2 is a diagram to explain the configuration of the card reader 1 shown in FIG. 1 from the side.

The card reader 1 of this embodiment is a device at which a user operates a card 2 by hand and which reproduces information recorded on the card 2 and records information on the card 2. The card reader 1, as shown in FIG. 1, is equipped with both a magnetic head 3 and IC contacts 4 for reproducing information recorded on the card 2 and recording information on the card 2. Inside the card reader 1, as shown in FIG. 2, a card moving passage 6 is formed linearly along which the card 2 inserted from a card insertion slot 2 moves.

The card reader 1 is also equipped with a lever member 9 which is a pulling-preventing member for preventing the card 2 inserted to the back from being pulled out. The lever member 9 is configured to be capable of turning to a closed position (see FIG. 3 (B)) at which it closes the card moving passage 6 and to an open position (see FIG. 3 (A)) at which it opens the card moving passage 6, and prevents the pulling of the inserted card 2 while in the closed position. Also, the card reader 1 is equipped with a torsion spring 10 which is an urging member for urging the lever member 9 to the closed position, a regulating pin 11 which is the turning-regulating member for regulating the turning of the lever member 9, and a solenoid 12 which drives the regulating pin 11 to the turning-regulating position at which it regulates the turning of the lever member 9 (see FIG. 3 (B)) and to the turning position at which the turning of the lever member 9 is enabled (see FIG. 3 (A)).

Further, the card reader 1 is equipped with a first sensor 14, a second sensor 15 and a third sensor 16 which detects that the regulating pin 11 is in the turning-regulating position. The first sensor 14, the second sensor 15 and the third sensor 16 of this embodiment are optical sensors, each of which has a light-emitting device (no illustration) and a light-receiving device (no illustration) arranged to face each other. The first sensor 14, the second sensor 15 and the third sensor 16 are all fixed to the frame of the card reader 1. When light emitted from the light-emitting device of each of the sensors 14 through 16 to its light-receiving device is intercepted, the sensor turns ON; when the light-receiving device of each of the sensors 14 through 16 receives light emitted from the light-emitting device, the sensors 14 through 16 are in the OFF status.

In this embodiment, the card 2 is moved in the X direction shown in FIG. 2. In other words, the X direction is the moving direction of the card 2. Also, the Z direction is the thickness direction of the card 2; the Y direction is the width direction of the card 2 (a shorter width direction) orthogonally intersecting with the X direction, which is the moving direction of the card 2, and the Z direction, which is the thickness direction of the card 2. Note that hereinafter, the X1 direction side in FIG. 1 and FIG. 2 is "the front", the X2 direction side is "the back", the Y1 direction side is "the right", the Y2 direction side is "the left", the Z1 direction side is "the top", and the Z2 direction side is "the bottom". In the description below, the clockwise direction in FIG. 2 is "the clockwise direction", and the counterclockwise direction in FIG. 2 is "the counterclockwise direction".

The card 2 is a rectangular polyvinyl chloride card with 0.7-0.8 mm thickness, for example. Formed on the surface of the card 2 is a magnetic strip 2a on which magnetic information is to be recorded (see FIG. 1). In other words, the card 2 used in this embodiment is a magnetic card. Also, an IC chip (no illustration) is fixed onto the surface of the card 2. In other words, the card 2 used in this embodiment is also a contact-type IC card.

Note that the card 2 may not have a magnetic strip 2a thereon but may instead have only an IC chip fixed thereto. Also, a communication antenna may be built in the card 2. A print section may be formed on the surface of the card 2 to print letters thereon by a thermal method. Further, the card 2 may be a PET (Polyethylene terephthalate) card with 0.18-0.36 mm thickness or a paper card with a predetermined thickness.

A portion of the card reader 1 on the front end is a notch portion 18 cut to facilitate the insertion of the card 2 and the removal of the card 2 by a user. More specifically described, as shown in FIG. 1, the notch portion 18 in a rectangular shape when viewed from the top-bottom direction is formed by cutting the frame of the card reader 1 from the front edge to the back side. Also, the notch portion 18 is located in the middle of the frame of the card reader 1 in the left-right direction; at both sides of the notch portion 18 in the left-right direction, a right-side projection portion 19 and a left-side projection portion 20 are formed. In this embodiment, as shown by a double dashed dotted line, a portion of the card 2 inserted to the back of the card reader 1 is exposed at the notch portion 18.

As shown in FIG. 2, the front end of the card moving passage 6 is configured as a card insertion slot 5. In other words, the card insertion slot 5 is formed at the front end of the right-side projection portion 19 and the front end of the left-side projection portion 20. Also, the magnetic head 3 is arranged in the vicinity of the card insertion slot 5. More specifically described, the magnetic head 3 is arranged on the front end of the right-side projection portion 19.

The IC contacts 4 are arranged at the back end of the card reader 1. The IC contacts 4 are also arranged above the card moving passage 6. The IC contacts 4 are fixed to a contacts-holding member 22. On the back end of the contacts-holding member 22, a card engaging portion (illustration omitted) is formed so that the front end (the back side end portion) of the card 2 engages therewith. Part of the contacts-holding member 22 is engaged with the guide groove whose illustration is omitted; the contacts-holding member 22 moves up and down while sliding in the front-back direction being guided along the guide groove. More specifically described, the contacts-holding member 22 descends as it moves further to the back, and ascends as it moves to the front side. Also, the contacts-holding member 22 is urged toward the front side by an extension spring 23. Note that the contacts-holding member 22 may be linked to a predetermined link mechanism whereby the contacts-holding member 22 moves up and down while sliding in the front-back direction.

In this embodiment, when the front end of the card 2 inserted to the back of the card reader 1 engages with the card engaging portion of the contacts-holding member 22, the contacts-holding member 22 descends while sliding further to the back so that the IC contacts 4 make contact with the IC chip of the card 2. On the other hand, when the card 2 inserted to the back is pulled toward the front, the contacts-holding member 22 ascends with the urging force of the extension spring 23 while sliding toward the front so that the IC contacts 4 leave the surface of the card 2.

To the contacts-holding member 22, a detecting protrusion 22a is formed for detecting, by collaborating with the second sensor 15, whether the card 2 is present at the back end. In this embodiment, the detecting protrusion 22a and the second sensor 15 are arranged in the following manner: when the card 2 is inserted to the back of the card reader 1, the contact-holding member 22 slides further to the back and the IC contacts 4 make contact with the IC chip of the card 2, the detecting protrusion 22a intercepts the light emitted from the light-emitting device of the sensor 15 to the light-receiving device; when the contacts-holding member 22 is positioned on the front side by the urging force of the extension spring 23, the light-receiving device of the second sensor 15 receives the light emitted from the light-emitting device. In other words, in this embodiment, when the detecting protrusion 22a intercepts the light emitted from the light-emitting device of the second sensor 15 to the light-receiving device and the second sensor 15 turns ON, the presence of the card reader 1 in the back end is detected.

(Configuration of Lever Member)

FIG. 3 (A) is a diagram to explain from the side the status of the card reader 1 when the card 2 is being inserted to the card reader 1 shown in FIG. 1; FIG. 3 (B) is a diagram to explain from the side the status of the card reader 1 when the card 2 is completely inserted to the card reader 1 shown in FIG. 1. FIG. 4 (A) is a plan view of a lever member 9 shown in FIG. 1; FIG. 4 (B) is a side view of the lever member 9 shown in FIG. 1.

The lever member 9 functions, as described above, to prevent the pulling out of a card that has been inserted to the back. More specifically described, the lever member 9 functions to prevent the pulling out of the card 2 while the IC chip of the card 2 and the IC contacts 4 are in contact with each other for communicating information. The lever member 9 is formed of resin, for example. Also, the lever member 9 is formed in a long, thin, stick shape as a whole; as shown in FIG. 1, it is arranged along the right side of the card reader 1 having the front-back direction as a longitudinal direction.

Figure 4A:
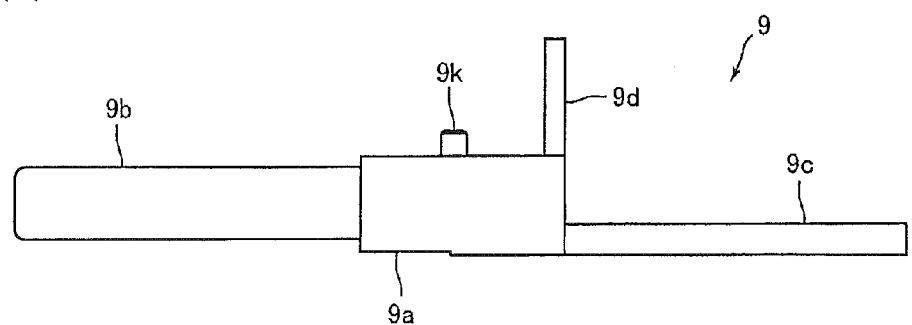
FIG. 4(A) is a plan view of the lever member shown in FIG. 1.
Figure 4B:
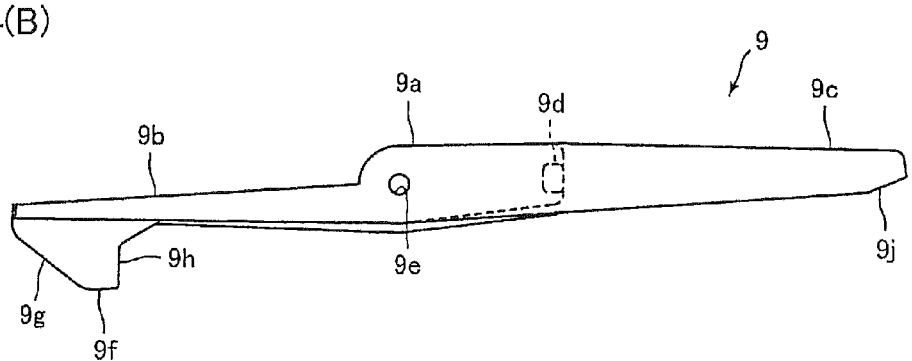
FIG. 4(B) is a side view of the lever member shown in FIG. 1.

The lever member 9, as shown in FIGS. 4(A)-4(B), is equipped with a turning center portion 9a which is the center of turning of the lever member 9, a card abutting portion 9b which abuts the rear end (the front side) of the card 2 to prevent the card 2 from being pulled out, and a regulating pin abutting portion 9c as the regulating member abutting portion on which the regulating pin 11 abuts.

The lever member 9 is also equipped with a card detecting portion 9d for detecting the presence of the card 2 on the front end by collaborating with the first sensor 14. In this embodiment, the insertion of the card 2 to the card reader 1 is also detected by the first sensor 14 and the card detecting portion 9d. In other words, the first sensor 14 is a sensor for detecting the insertion of the card 2, and the card detecting portion 9d is an insertion-detecting portion to collaborate with the first sensor 14 for detecting the insertion of the card 2 to the card reader 1.

The card abutting portion 9b is arranged on the front end, and the regulating pin abutting portion 9c is arranged on the back side. Also, the turning center portion 9a is positioned in the center in the front-back direction between the card abutting portion 9b and the regulating pin abutting portion 9c. In other words, the card abutting portion 9b, the turning center portion 9a and the regulating pin abutting portion 9c are arranged in this order from the front side to the back side. The card detecting portion 9d is formed so as to project toward the right end.

The turning center portion 9a is arranged above the card moving passage 6. Through the turning center portion 9a a fixed shaft 25 is passed to support the lever member 9 as it turns. As shown in FIG. 4 (B), a shaft hole 9e through which the fixed shaft is passed is formed in the turning center portion 9a.

As shown in FIG. 4 (B), a projecting portion 9f is formed to project downwardly at the front side of the card abutting portion 9b. The side face of the projecting portion 9f on the front is a flat, inclining face 9g which inclines gradually downwardly as it goes toward the back. On the other hand, the back face of the projecting portion 9f is a flat, orthogonal plane which orthogonally intersects with the transporting direction (the X direction) of the card 2, and the back face of the projecting portion 9f is formed as an abutting face 9h on which the rear end of the card 2 abuts while being pulled.

The regulating pin abutting portion 9c is arranged above the card moving passage 6. The bottom face of the regulating pin abutting portion 9c at the back end is formed as a flat abutting face 9j on which the regulating pin 11 abuts. The abutting face 9j is formed as an inclining face which gradually inclines upwardly as it goes further to the back.

As shown in FIG. 1, the fixed shaft 25 which is passed through the shaft hole 9e is fixed to the frame of the card reader having the left-right direction as an axial direction. The fixed shaft 25 is also passed through the torsion spring 10. The torsion spring 10 is arranged on the left side of the turning center portion 9a. One end of the torsion spring 10 is engaged with the spring engaging portion 26 formed in the frame of the card reader 1, and the other end of the torsion spring 10 is engaged with the engaging protrusion 9k formed in the lever member 9.

The spring engaging portion 26 is arranged more front side than the fixed shaft 25; the torsion spring 10 urges the lever member 9 in the counterclockwise direction. For this reason, when the card 2 is not inserted, the bottom end of the projecting portion 9f abuts on the recess portion 27 notched in the bottom face of the card moving passage 6 at the front end, as shown in FIG. 2. In other words, when the card 2 is not inserted, the lever member 9 closes the front end of the card moving passage 6. This position of the lever member 9 when closing the front end of the card moving passage 6 is the closed position.

On the other hand, when the card 2 is inserted, the front end of the card 2 abuts on the inclining face 9g of the lever member 9 which has been keeping the front end of the card moving passage 6 closed. When the card 2 is pushed further to the back while the front end thereof abuts on the inclining face 9g, as shown in FIG. 3 (A), the lever member 9 is turned in the clockwise direction against the urging force of the torsion spring 10 to open the front end of the card moving passage 6. This position of the lever member 9 to open the front end of the card moving passage 6 is the open position.

When the card 2 is pushed further to the back and the rear end of the card 2 passes below the projecting portion 9f, as shown in FIG. 3 (B), the lever member 9 is turned in the counterclockwise direction by the urging force of the torsion spring 10 until the bottom end of the projecting portion 9f comes into contact with the recess portion 27, in order to close the front end of the card moving passage 6.

The card detecting portion 9d is formed to project toward the left from the back side of the turning center portion 9a. The card detecting portion 9d and the first sensor 14 are arranged in the following manner: as shown in FIG. 2 and FIG. 3 (B), when the lever member 9 is in the closed position, the card detecting portion 9d intercepts the light emitted from the light-emitting device of the first sensor 14 to its light-receiving device; as shown in FIG. 3 (A), when the lever member 9 is in the open position, the light-receiving device of the first sensor 14 receives the light emitted from its light-emitting device. In other words, in this embodiment, when the light-receiving device of the first sensor 14 receives the light emitted from the light-emitting device and the first sensor 14 turns OFF, the presence of the card 2 on the front side of the card reader 1 is detected.

(Configuration of Regulating Pin and its Peripheries)

FIG. 5 (A) is a plan view of the status of the regulating pin 11 shown in FIG. 1 in the turning position; FIG. 5 (B) is a plan view of the status of the regulating pin 11 shown in FIG. 1 in the turning-regulating position.

The regulating pin 11 is formed like a long, thin rod and fixed to an end of the plunger 12a of the solenoid 12. More specifically described, the regulating pin 11 is fixed to the end of the plunger 12a having the left-right direction as an axial direction such that the left and right ends thereof project from the plunger 12. As shown in FIG. 2, the regulating pin 11 is arranged at a height equal to that of the fixed shaft 25.

Figure 5A:
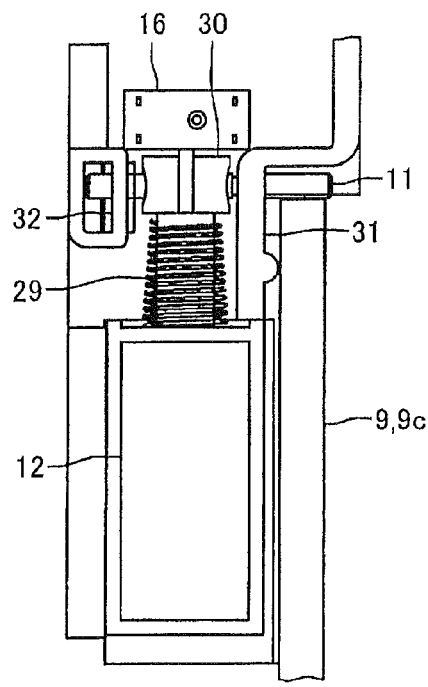
FIG. 5(A) is a plan view of the regulating pin shown in FIG. 1 in a turning position.
Figure 5B:
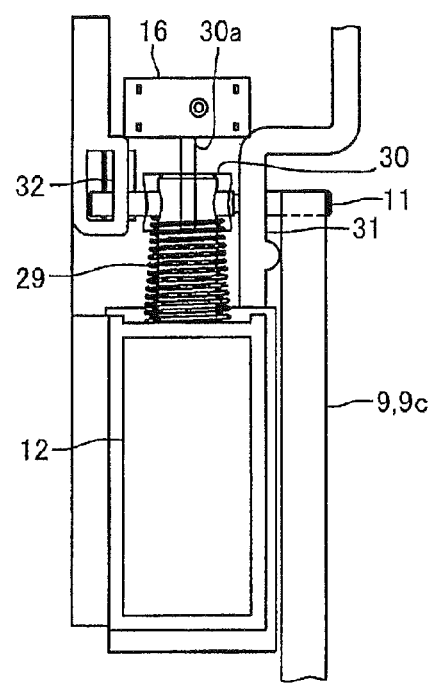
FIG. 5(B) is a plan view of the regulating pin shown in FIG. 1 in a turning-regulating position.

The solenoid 12 is arranged such that the plunger 12a moves in the front-back direction. More specifically described, the solenoid 12 is arranged such that the plunger 12a projects toward the back. Also, the solenoid 12 is arranged such that the plunger 12a is adjacent to the left side of the regulating pin abutting portion 9c of the lever member 9. As shown in FIGS. 5(A)-5(B), the plunger 12a is passed through the resetting compression spring 29, and is urged by the compression spring 29 toward the back (i.e., the direction in which the plunger 12a projects). Note that, in FIG. 1 through FIG. 3(B), the illustration of the compression spring 29 is omitted.

As shown in FIG. 3 (A) and FIG. 5 (A), when the solenoid 12 is not driven (the current is not applied to the solenoid 12) and the plunger 12a is projected to the back by the urging force of the compression spring 29, the regulating pin 11 is in a position (the position in the back) at which it cannot abut on the abutting face 9j of the regulating abutting portion 9c. This position of the regulating pin 11 at which it cannot abut on the abutting face 9j is the turning position at which the turning of the lever member 9 is enabled.

On the other hand, as shown in FIG. 3 (B) and FIG. 5 (B), when the solenoid 12 is driven (the current is applied to the solenoid 12) and the plunger 12a is pulled to the front, the regulating pin 11 is in a position (the position in the front) at which it can abut on the abutting face 9j of the regulating pin abutting portion 9c. More specifically described, as shown in FIG. 5 (B), it is in a position at which the right end portion of the regulating pin 11 can abut on the abutting face 9j. This position of the regulating pin 11 at which it can abut on the abutting face 9j is the turning-regulating position that regulates the turning of the lever member 9.

Arranged between the fixing portion of the regulating pin 11 to the plunger 12a and the right end portion of the regulating pin 11 is the support member 31 which is formed to the frame of the card reader 1; the right end of the regulating pin 11 is supported by the support member 31. Also, arranged on the left side of the regulating pin 11 is a support member 32 which is formed to the frame of the card reader 1; the left end of the regulating pin 11 is supported by the support member 32. Note that the illustration of the support members 31 and 32 is omitted in FIG. 2 and FIGS. 3(A)-3(B).

As shown in FIG. 2, etc., a guide groove (guide hole) 31a is formed in the support member 31 for guiding the regulating pin 11 in the front-back direction. More specifically described, the guide groove 31a whose shape viewed from the left-right direction is a rectangular shape having the front-back direction as a longitudinal direction, is formed in the support member 31. The depth of the guide groove 31a (the width in the top-bottom direction) is slightly more than the diameter of the regulating pin 11.

The support member 31 supports the regulating pin 11 from below. In other words, the regulating pin 11 abuts on the support member 31 in the direction in which the abutting face 9j of the regulating pin abutting portion 9c faces the regulating pin 11 (in the clockwise direction, the turning direction of the lever member 9 to the open position), and the support member 31 supports the regulating pin 11 on which it abuts.

In the same manner, a guide groove (no illustration) is formed in the support member 32 for guiding the regulating pin 11 in the front-back direction. This guide groove is formed in the same manner as the guide groove 31a formed in the support member 31. Also, the support member 32 supports the regulating pin 11 from below.

To the end of the plunger 12a, the detecting member 30 is fixed for detecting the position of the regulating pin 11 by collaborating with the third sensor 16. Formed to the detecting member 30 is a detecting sheet portion 30a which is parallel to the ZX plane formed by the Z direction and the X direction and widened to the top side and the back side.

In this embodiment, the detecting sheet portion 30a and the third sensor 16 are arranged in the following manner: when the plunger 12a is projected to the back side, the detecting sheet portion 30a intercepts light emitted from the light-emitting device of the third sensor 16 to the light-receiving device; when the solenoid 12 is driven and the plunger 12a is pulled to the front, the light-receiving device of the third sensor 16 receives the light emitted from the light-emitting device. In other words, when the light-receiving device of the third sensor 16 receives the light emitted from the light-emitting device and the third sensor 16 turns OFF, it is detected that the regulating pin 11 is in the turning-regulating position.

(Operation of Card Reader)

In the card reader 1 configured as above, as shown in FIG. 2, when the card 2 is not inserted, the lever member 9 closes the front end of the card moving passage 6 with the urging force of the torsion spring 10. In this state, the plunger 12a is projected further to the back by the urging force of the compression spring 29, and accordingly the lever member 9 is able to turn. Also, in this state, the contacts-holding member 22 is urged to the front by the extension spring 23, and the IC contacts 4 are arranged above the card moving passage 6. Note that, the first sensor 14 and the third sensor 16 are in the ON status at that time, and the second sensor is in the OFF status.

As shown in FIG. 3 (A), when the card 2 is inserted, the lever member 9 is turned clockwise by the inserted card 2 against the urging force of the torsion spring 10 to open the front end of the card moving passage 6. When the lever member 9 is turned clockwise, the card detecting portion 9d moves away from the position between the light-emitting device and light-receiving device of the first sensor 14 and therefore the light-receiving device receives the light emitted from the light-emitting device of the first sensor 14; accordingly, the first sensor turns OFF and the insertion of the card 2 is detected.

Then, the card 2 is inserted further to the back and the rear end of the card 2 passes below the projecting portion 9f, as shown in FIG. 3 (B), the lever member 9 is turned counterclockwise by the urging force of the torsion spring 10 to close the front end of the card moving passage 6. When the lever member 9 is turned counterclockwise, the card detecting portion 9d intercepts the light emitted from the light-emitting device of the first sensor 14 to the light-receiving device, and therefore, the first sensor turns ON again.

Also, when the card 2 is inserted to the back, the contacts-holding member 22 is descended by the inserted card 2 while sliding to the back and the IC contacts 4 make contact with the IC chip of the card 2. Under this condition, the information is communicated between the IC chip of the card 2 and the IC contacts 4. Also, when the contact-holding member 22 slides to the back, the detecting protrusion 22a intercepts the light emitted from the light-emitting device of the second sensor 15 to the light-receiving device; therefore, the second sensor 15 turns ON, and it is detected that the card 2 is present in the back.

In this embodiment, when the first sensor 14 that had turned OFF once turns ON again and the second sensor 15 turns ON, the solenoid 12 is driven and as shown in FIG. 3 (B) and FIG. 5 (B), the plunger 12a is pulled toward the front and the regulating pin 11 is enabled to abut on the abutting face 9j of the regulating pin abutting portion 9c. In other words, the turning of the lever member 9 is regulated. For this reason, even if a user attempts to pull the card 2 to the front, the rear end of the card 2 abuts on the abutting face 9h of the lever member 9 to prevent the card 2 from being pulled out. Note that, when the plunger 12a is pulled toward the front, the third sensor 16 turns OFF.

Once the information communication is completed between the IC chip of the card 2 and the IC contacts 4, the electrifying of the plunger 12a is stopped and the plunger 12a is projected further to the back by the urging force of the compression spring 29. In other words, the lever member 9 is enabled to turn. At that time, the card 2 is pulled to the front.

Note that, when the magnetic information recorded in the magnetic strip 2a is reproduced either in addition to the information communication between the IC chip of the card 2 and the IC contacts 4 or in place of the information communication between the IC chip of the card 2 and the IC contacts 4, the magnetic information is reproduced at the time of the insertion or removal of the card 2. Also, the friction between the card 2 and the IC contacts 4 caused when the IC contacts 4 are in contact with the IC chip of the card 2 is slightly larger than the urging force of the extension spring 23. Therefore, even when the lever member 9 is in a turn-enabled status, the card 2 will not fly out toward the front by itself.

(Major Effects of the Embodiment)

As described above, in this embodiment, the lever member 9 closes the card moving passage 6 by using the urging force of the torsion coil spring 10 and the turning of the lever member 9 which closes the card moving passage 6 is regulated by the regulating pin 11, and the regulating pin 11 is moved by the solenoid 12. For this reason, there is no need to turn the lever member 9 with the driving power from the solenoid 12 and there is no need to have the lever member 9 keep the card moving passage 6 closed with the power from the solenoid 12. Therefore, in this embodiment, even when a solenoid 12 with a small output is used, the pulling out of the card 2 can be prevented, and thus there is no need to apply much current to the solenoid 12 during its operation. As a result, in this embodiment, energy can be saved. Also, since energy can be saved, a so-called bus power supply can be used in which a power supplied from a cable such as an USB is used to drive various devices inside the card reader 1.

In this embodiment, the regulating pin 11 abuts on the support member 31, 32 in the direction in which the abutting face 9j of the regulating pin abutting portion 9c faces the regulating in 11, and the support members 31 and 32 support the abutting regulating pin 11 from below. Therefore, even if a user attempts to pull out the card 2 while the lever member 9 is in the closed position at which its turning is regulated and a large force is applied to the lever member 9 and the regulating pin 11, the force can be prevented from being transmitted to the solenoid 12. Accordingly, damage to the solenoid 12 can be prevented.

In this embodiment, the lever member 9 is configured to be capable of turning, having the left-right direction as an axial direction. Therefore, even when the lever member 9 is urged to the closed position by the torsion spring 10, the lever member 9 can be easily turned to the open position by the inserted card 2. In particular, since the front end face 9g of the card abutting portion 9b is the inclining face in this embodiment, the lever member 9 can be easily turned to the open position by the inserted card 2.

In this embodiment, the guide groove 31a is formed in the support member 31 for guiding the regulating pin 11 in the front-back direction, and another guide groove is formed in the support member 32 for guiding the regulating pin 11 in the front-back direction. Also, the solenoid 12 is arranged such that the plunger 12a moves in the front-back direction. Therefore, the regulating pin 11 can be smoothly moved to the turning-regulating position and to the turning position.

In this embodiment, the lever member 9 is equipped with the card detecting portion 9d which detects the insertion of the card 2 by collaborating with the first sensor 14. In other words, the lever member 9 has a partial function of the card 2 insertion detection. Therefore, there is no need to provide an additional member which detects the insertion of the card 2 by collaborating with the first sensor 14. Thus, the configuration of the card reader 1 can be simplified.

In this embodiment, the lever member 9 is formed like a long, thin stick in which the card abutting portion 9b, the turning center portion 9a and the regulating pin abutting portion 9c are arranged in this order in the front-back direction. Therefore, even when the regulating pin 11 abuts on the abutting face 9j of the regulating pin abutting portion 9c to regulate the turning of the lever member 9, the card 2 can be pulled out by flexing the portion between the turning center portion 9a and the card abutting portion 9b. Thus, even if a user attempts to pull out the card 2 when the turning of the lever member 9 is regulated, an excessive stress is prevented from being applied to the lever member 9 and the regulating pin 11, thus preventing damage to the lever member 9 and the regulating pin 11.

Other Embodiment

The above-described embodiment is an example of preferred embodiments of the present invention; however, the present invention is not limited to this, but also can be variously modified within the scope of the present invention.

Figure 6:
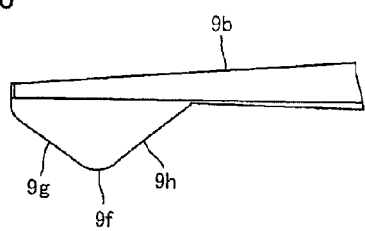
FIG. 6(A) is a side view of a portion of a lever member of another embodiment of the present invention.

In the above-described embodiment, the abutting face 9h on which the rear end of the card 2 to be pulled abuts is a flat, orthogonal plane orthogonally intersecting with the X direction. Alternatively, as shown in FIG. 6, the abutting face 9h on which the rear end of the card 2 to be pulled abuts may be a flat, inclining face which gradually inclines downwardly as it goes toward the front. With this configuration, when the card 2 to be pulled out abuts on the abutting face 9h of the lever member 9h whose turning is regulated, an upward force is easily generated to the card abutting portion 9b; therefore, the portion between the turning center portion 9a and the card abutting portion 9b can be flexed easily. Consequently, the card 2 can be pulled out easily, effectively preventing damage to the lever member 9 and the regulating pin 11.

In the above-described embodiment, the lever member 9 is urged to the closed position by the torsion spring 10. Alternatively, the lever member 9 may be urged to the closing portion by a compression spring, an extension spring or a sheet spring.

In the above-described embodiment, when the solenoid 12 is driven, the plunger 12a is pulled toward the front so that the regulating pin 11 comes to a position at which it can abut on the abutting face 9j of the regulating pin abutting portion 9c. Alternatively, the card reader 1 may be configured such that when the solenoid 12 is driven, the plunger 12a may be pulled to the back so that the regulating pin 11 comes to a position at which it can abut on the abutting face 9j. Also, the card reader 1 may be configured such that when the solenoid 12 is driven the plunger 12a is moved in the left-right direction and the regulating pin 11 comes to a position at which it can abut on the abutting face 9j.

In the above-described embodiment, the regulating pin 11 is arranged on the back side to regulate the turning of the lever member 9 in the back. Alternatively, the regulating pin 11 may be arranged on the front side to regulate the turning of the lever member 9 in the front. At that time, the regulating pin abutting portion 9c does not need to be formed to the lever member 9.

In the above-described embodiment, the lever member 9 formed having the front-back direction as a longitudinal direction turns having the left-right direction as an axial direction. Alternatively, the lever member formed having the left-right direction as a longitudinal direction may be turned having the front-back direction as an axial direction.

In the above-described embodiment, the first sensor 14 is an optical sensor; however, the first sensor 14 may be a mechanical sensor such as a micro switch.

In the above-described embodiment, the card reader 1 is equipped with both a magnetic head 3 and IC contacts 4; however, the card reader 1 may be equipped with either the magnetic head 3 or the IC contacts 4. When the card reader 1 is equipped with only the magnetic head 3, the IC chip does not need to be fixed onto the card 2. Also, in the above-described embodiment, the card reader 1 is manual; however, the configuration of the present invention can be applied to a card reader having an automatic transporting mechanism of the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
  a card moving passage in which the card is moved;
  a pulling-preventing member which is structured to turn between an open position to open said card moving passage and a closed position to close said card moving passage and prevent pulling out of said card;
  an urging member structured to urge said pulling-preventing member to said closed position;
  a turning-regulating member structured to regulate turning of said pulling-preventing member by abutting on said pulling-preventing member at said closed position; and
  a solenoid structured to drive said turning-regulating member to a turning-regulating position at which the turning of said pulling-preventing member is regulated and to a turning position at which the turning of said pulling-preventing member is enabled;
  wherein said pulling-preventing member is structured to turn about an axis in a width direction of said card, said width direction being orthogonal to a moving direction of said card and to a thickness direction of said card;
  wherein said pulling-preventing member comprises:
    a turning center portion which is a center of turning of said pulling-preventing member,
    a card abutting portion which abuts on an end face of said card to prevent said card being pulled, and
    a regulating member abutting portion which abuts on said turning-regulating member;
  wherein said card abutting portion, said turning center portion, and said regulating member abutting portion are arranged in an order of the card abutting portion, the turning center portion, and the regulating member abutting portion along the moving direction of said card;

wherein said regulating member abutting portion is located at the turning-regulating position when the solenoid is driven and, when the solenoid is not driven, said regulating member abutting portion is located at the turning position at which the turning of said pulling-preventing member is enabled.

2. The card reader of claim 1 further comprising a support member abutting on said turning-regulating member in the turning direction of said pulling-preventing member to said closed position and which supports said turning-regulating member.

3. The card reader of claim 1 further comprising a guide groove structured to guide said turning-regulating member along the moving direction of said card; and said solenoid comprises a plunger to which said turning-regulating member is fixed, the plunger being structured to move in the moving direction of said card.

4. The card reader of claim 1, further comprising a sensor structured to detect insertion of said card;

wherein said pulling-preventing member comprises an insertion-detecting portion which detects the insertion of said card by collaborating with said sensor.

* * * * *